(12) United States Patent
Cho et al.

(10) Patent No.: US 10,158,753 B2
(45) Date of Patent: Dec. 18, 2018

(54) METHOD AND APPARATUS FOR GENERATING VOICE CALL QUALITY INFORMATION IN WIRELESS COMMUNICATION SYSTEM

(71) Applicant: Samsung Electronics Co., Ltd., Suwon-si, Gyeonggi-do (KR)

(72) Inventors: Hyeonje Cho, Suwon-si (KR); Hanseok Kim, Seoul (KR); Dongsook Kim, Suwon-si (KR); Dowon Hyun, Seoul (KR); Soonyoung Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/608,215

(22) Filed: May 30, 2017

(65) Prior Publication Data

US 2017/0353598 A1 Dec. 7, 2017

Related U.S. Application Data

(60) Provisional application No. 62/344,361, filed on Jan. 6, 2016.

(30) Foreign Application Priority Data

Jun. 10, 2016 (KR) .................. 10-2016-0072756

(51) Int. Cl.
*H04W 36/30* (2009.01)
*H04M 3/22* (2006.01)
*H04L 12/26* (2006.01)

(52) U.S. Cl.
CPC ...... *H04M 3/2236* (2013.01); *H04L 43/0817* (2013.01); *H04M 3/2227* (2013.01); *H04L 43/08* (2013.01); *H04M 2207/18* (2013.01); *H04W 36/30* (2013.01)

(58) Field of Classification Search
CPC ..... G10L 19/008; G10L 19/167; G10L 19/18; G10L 13/033; G10L 21/003; G10L 13/04; G10L 2021/0135; G10L 13/00; G10L 21/0208; G10L 25/60; G10L 19/028; G10L 25/84; H04L 65/80; H04L 43/0829
See application file for complete search history.

(56) References Cited

U.S. PATENT DOCUMENTS

| | | | |
|---|---|---|---|
| 2006/0252376 A1* | 11/2006 | Fok ..................... | H04M 3/2236 455/67.13 |
| 2008/0212567 A1 | 9/2008 | El-Hennawey et al. | |
| 2010/0062724 A1 | 3/2010 | Fok et al. | |
| 2014/0064137 A1 | 3/2014 | El-Hennawey et al. | |
| 2014/0358526 A1* | 12/2014 | Abdelal .................. | G10L 25/30 704/202 |

(Continued)

FOREIGN PATENT DOCUMENTS

KR 10-1514633 B1 4/2015

*Primary Examiner* — Kwasi Karikari
(74) *Attorney, Agent, or Firm* — Jefferson IP Law, LLP (57) ABSTRACT

A voice call quality information generation method and an apparatus of a server for use in a wireless communication system are provided. The voice call quality information generation method includes receiving log information from at least one base station and generating voice call quality information using muting information generated based on the log information.

20 Claims, 11 Drawing Sheets

(56) References Cited

U.S. PATENT DOCUMENTS

2015/0179187 A1 6/2015 Xiao et al.
2015/0207710 A1* 7/2015 Dickins .................. H04L 65/80
370/252

* cited by examiner

METHOD AND APPARATUS FOR GENERATING VOICE CALL QUALITY INFORMATION IN WIRELESS COMMUNICATION SYSTEM

CROSS-REFERENCE TO RELATED APPLICATION(S)

This application claims the benefit under 35 U.S.C. § 119(e) of a U.S. Provisional application filed on Jun. 1, 2016 in the U.S. Patent and Trademark Office and assigned Ser. No. 62/344,361 and under 35 U.S.C. § 119(a) of a Korean patent application filed on Jun. 10, 2016 in the Korean Intellectual Property Office and assigned Serial number 10-2016-0072756, the entire disclosure of each of which is hereby incorporated by reference.

TECHNICAL FIELD

The present disclosure relates to a method and apparatus for generating voice call quality information of a voice call service in a wireless communication system.

BACKGROUND

With the emerge of voice over internet protocol (VoIP) technology, the voice call service migrates from the legacy circuit-switched wired/wireless telephony networks to packet-switched networks such as Internet.

As the long-term evolution-advanced (LTE-A) is standardized as one of the advanced $4^{th}$ generation (4G) mobile communication technologies, voice over LTE (VoLTE) are deployed as a dominant packet-switched voice call service over a mobile communication network.

In a voice call service over a packet-switched network which is characterized in that voice data are carried in packets with an internet protocol (IP) address (a packet is the smallest unit of data transmission), packet loss or delay caused by network condition may degrade voice call quality.

Thus, there is a need of a quality management of the voice call service over a packet-switched network. Typically, the quality management is performed in such a way of measuring packet loss, delay, and jitter during a voice call and calculating mean opinion score (MOS) based on the measurement result.

However, the method for managing the call quality of a voice call service over a packet network according to the related art has a drawback of being limited to only making a poor voice call quality determination through an end-to-end voice analysis.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for managing voice call service quality efficiently based on per-link muting ratios of a mobile network which are calculated using the log information collected by a base station.

In accordance with an aspect of the present disclosure, a voice call quality information generation method of a server is provided for use in a wireless communication system is provided. The voice call quality information generation method includes receiving log information from at least one base station and generating voice call quality information using muting information generated based on the log information.

In accordance with another aspect of the present disclosure, a server for generating voice call quality information for use in a wireless communication system is provided. The server includes a transceiver configured to transmit and receive signals and at least one processor configured to controls the transceiver to receive log information from at least one base station and generates the voice call quality information based on muting information generated based on the log information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the present disclosure and methods of accomplishing the same may be understood more readily by reference to the following detailed description of various embodiments and the accompanying drawings. The present disclosure may, however, be embodied in many different forms and should not be construed as being limited to the various embodiments set forth herein. Rather, these various embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce manufacture articles embedding instruction means which implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Figure 1:
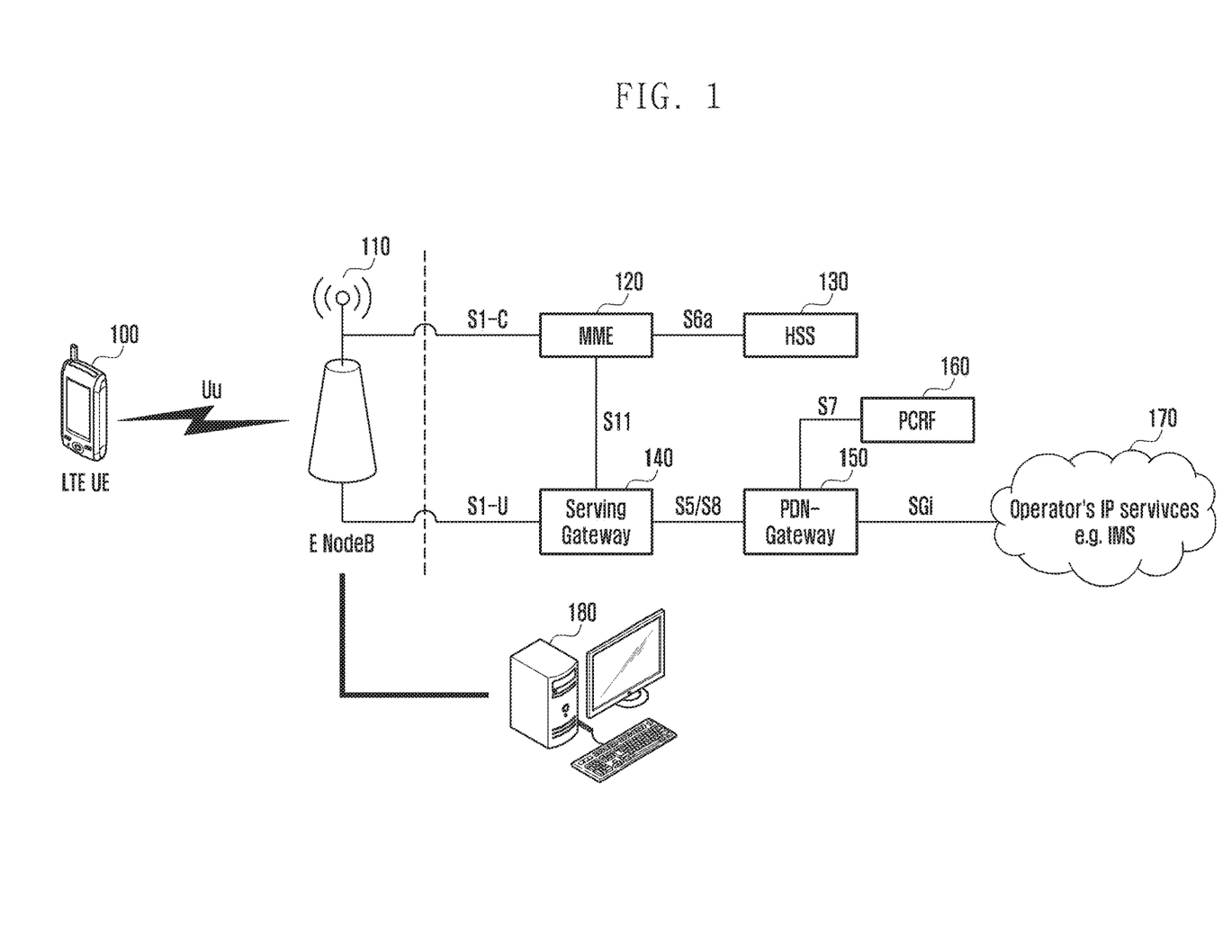
FIG. 1 is a diagram illustrating a mobile network according to an embodiment of the present disclosure.

FIG. 1 is a diagram illustrating a mobile network according to an embodiment of the present disclosure.

The present disclosure relates to a method for managing voice call quality of a voice call service over a mobile network (e.g., Voice over long term evolution (VoLTE)) and, in particular, a method for managing the voice call quality by calculating per-link muting ratios of a mobile network during a voice call session, calculating user-experienced muting ratio, matching transmit and receive terminals, and performing end-to-end voice quality analysis to generate a metric for use in voice call quality management.

The voice call service is provided for subscribers to communicate in real time by exchanging voice over a communication network. In the case of a voice call service over a packet-switched network, the voice data is converted into digital packets to be delivered through an internet protocol (IP)-based packet-switched network such as Internet.

Referring to FIG. 1, a mobile network may include a user equipment (UE) 100, an evolved node B (eNB) 110, a mobility management entity (MME) 120, a home subscriber server (HSS) 130, a serving gateway (S-GW) 140, a packet data network (PDN) gateway (P-GW) 150, a policy and charging rules function (PCRF) 160, an IP multimedia subsystem (IMS) 170, and a server 180.

The UE 100 connects to the eNB 110 directly through radio resources to transmit and receive data to and from the eNB 110.

The eNB 110 may detect the UE 100 within its communication coverage and perform access control and radio resource allocation to the UE 100 in response to a connection request transmitted by the UE 100 for supporting data communication of the UE 100 using the allocated radio resources.

The eNB 110 connects to a core network, which makes it possible for the UEs connected to the eNB 110 to perform data communication using IP addresses. The core network may include the MME 120, the HSS 130, the S-GW 140, the P-GW 150, the PCRF 160, and the IMS 170. In an embodiment, the core network may further include the server 180.

The MME 120 takes charge of various control functions, and a plurality of eNBs may connect to one MME. The HSS 130 is a subscriber database for managing subscriber information such as subscriber's location, authorization, status, and supplementary services.

The S-GW 140 manages data bearers in such a way of establishing and releasing a data bearer under the control of the MME 120.

The P-GW 150 is a connection point for a PDN such as IMS 170, Internet, and other mobile communication network and serves as an anchor point for handover of the UE 100 between communication networks.

The PCRF 160 manages user-specific quality of service (QoS) policy and provides the P-GW 150 with a policy and charging control (PCC) rule. The PCRF 160 is an entity taking charge of controlling QoS and billing of traffic.

The IMS 170 manages communication resources, service quality, and security of IP-based networks including LTE, Wi-Fi, and other wired communication networks.

In an embodiment of the present disclosure, the server 180 may receive log information from the eNB 110 and manage voice call quality in a mobile network based on the log information. That is, the server 180 may generate a voice call quality metric based on the voice call quality information collected by the eNB 110 for use in managing the voice call quality in the mobile network.

The log information may include at least one of information on packets traveling between the UE 100 and the eNB 110, information on packets traveling (or processed and delivered to an upper or lower layer) inside the eNB 110, and information on packets traveling between eNBs.

Figure 2:
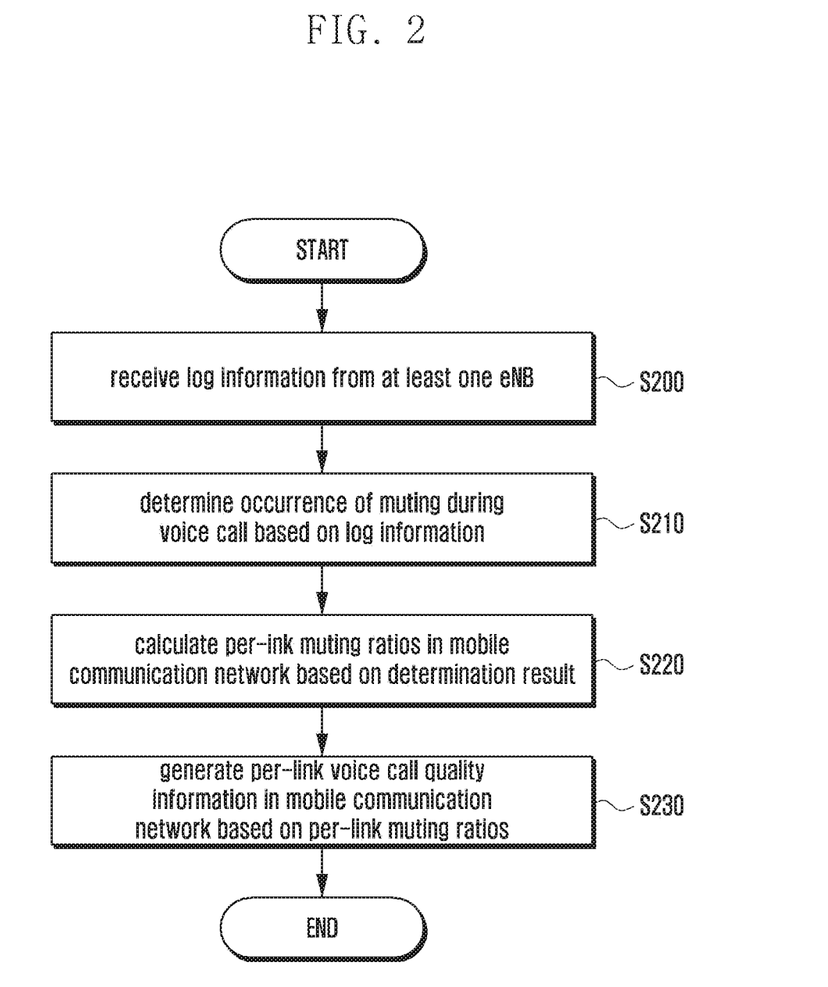
FIG. 2 is a flowchart illustrating a voice call quality management method of a server in a mobile communication network according to an embodiment of the present disclosure.

FIG. 2 is a flowchart illustrating a voice call quality management method of a server in a mobile communication network according to an embodiment of the present disclosure.

Referring to FIG. 2, the server may receive log information from at least one eNB in the mobile communication network at operation S200. The log information may include at least one of first type packet information on packets traveling between a UE and an eNB, second type packet information on packets traveling inside the eNB, and third type packet information on packets traveling between eNBs.

According to an embodiment of the present disclosure, the server may rearrange at least one of the first type packet information, the second type packet information, and the third type packet information for log information analysis.

Figure 8:
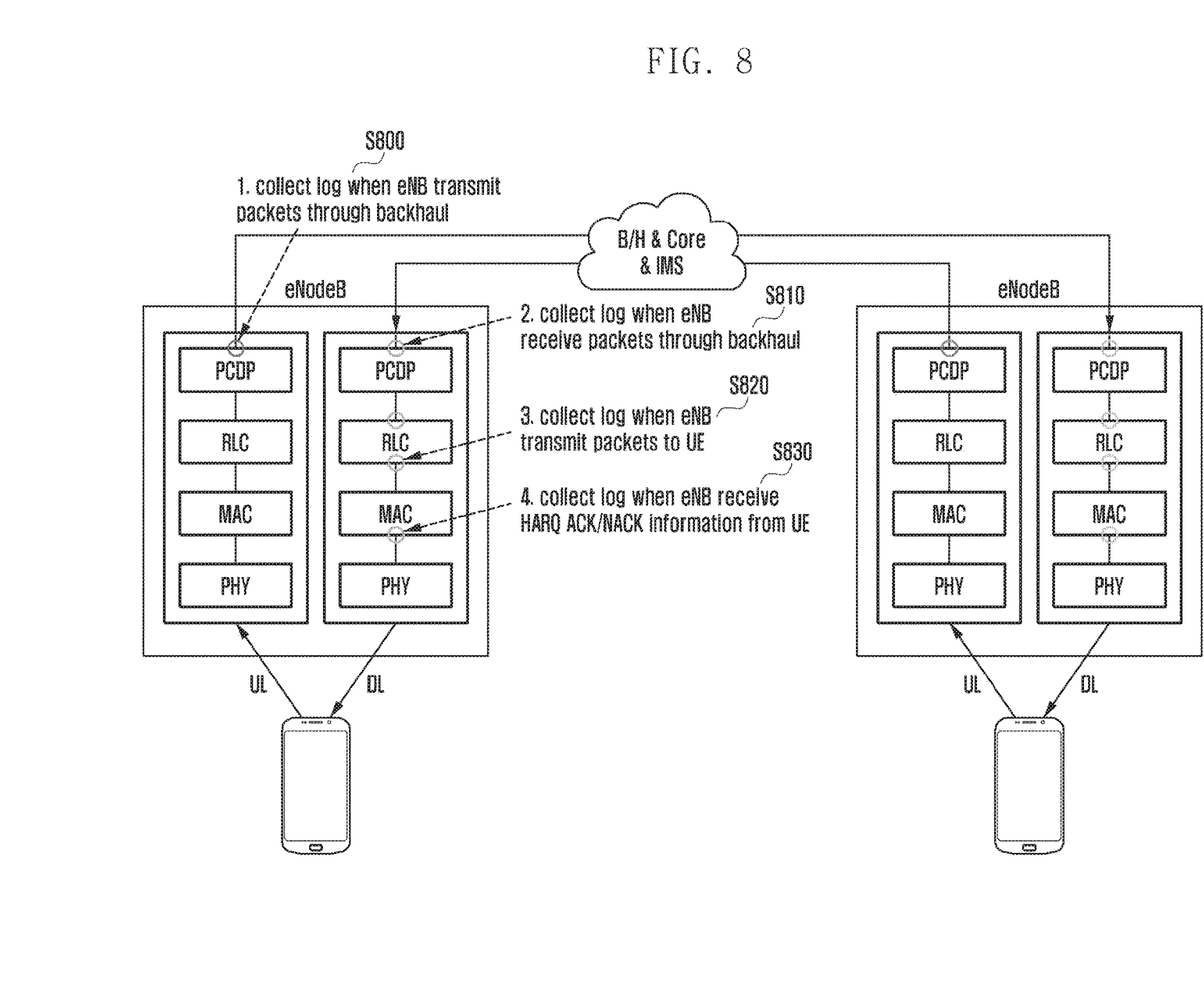
FIG. 8 is a conceptual diagram illustrating a voice call quality management method in a mobile communication network according to an embodiment of the present disclosure.

For a wireless packet-based voice call service (e.g., VoLTE), an eNB collects information on the packets (or log information) at protocol layer-specific entities as shown in FIG. 8. The collected information may include packet transmission/reception time and VoLTE packets.

The server may acquire predetermined information from the packet information collected by the eNB and store the acquired information separately for use in analysis about muting, packet loss, and jitter.

The server may determine at operation S210 whether a muting occurs during a voice call based on the log information. It is determined that a muting has occurred when one of the following two conditions is fulfilled: that an interval between voice packets is longer than a first threshold and that a number of lost packet during the interval is greater than a second threshold.

At operation S220, the server may calculate per-link muting ratios in the mobile communication network based on the determination result of operation S210. The per-link muting ratio may be calculated by the call, the cell, or the eNB. Here, the term "link" denotes a link between two nodes in the mobile communication network, e.g., between an eNB and a UE, between two layer-specific entities inside an eNB, and between an eNB and a core network entity.

According to an embodiment of the present disclosure, if the per-link muting ratio is calculated by the call, the per-link muting ratio may denote a ratio of the time of the muting occurred during a voice call session.

According to an embodiment of the present disclosure, if the per-link muting ratio is calculated by the cell, the per-link muting radio may denote a ratio of the time of the muting occurred in all voice call sessions established in a cell to the total time of the voice call sessions.

According to an embodiment of the present disclosure, if the per-link muting ratio is calculated by the eNB, the per-link muting ratio may denote a ratio of the time of the muting occurred in all voice call sessions processed by an eNB to the total time of the voice call sessions.

The server may generate per-link voice call quality information based on the per-link muting ratio at operation S230. The server may identify the network link (or a point in the network) where a problem has occurred based on the per-link voice call quality information. That is, the server may determine whether a voice call quality is poor based on the per-link voice call quality information and, if so, inspects the network link where the poor voice call quality problem has occurred.

The server may provide the per-link voice call quality information to at least one eNB or network operator for the purpose of voice call quality management.

Figure 3:
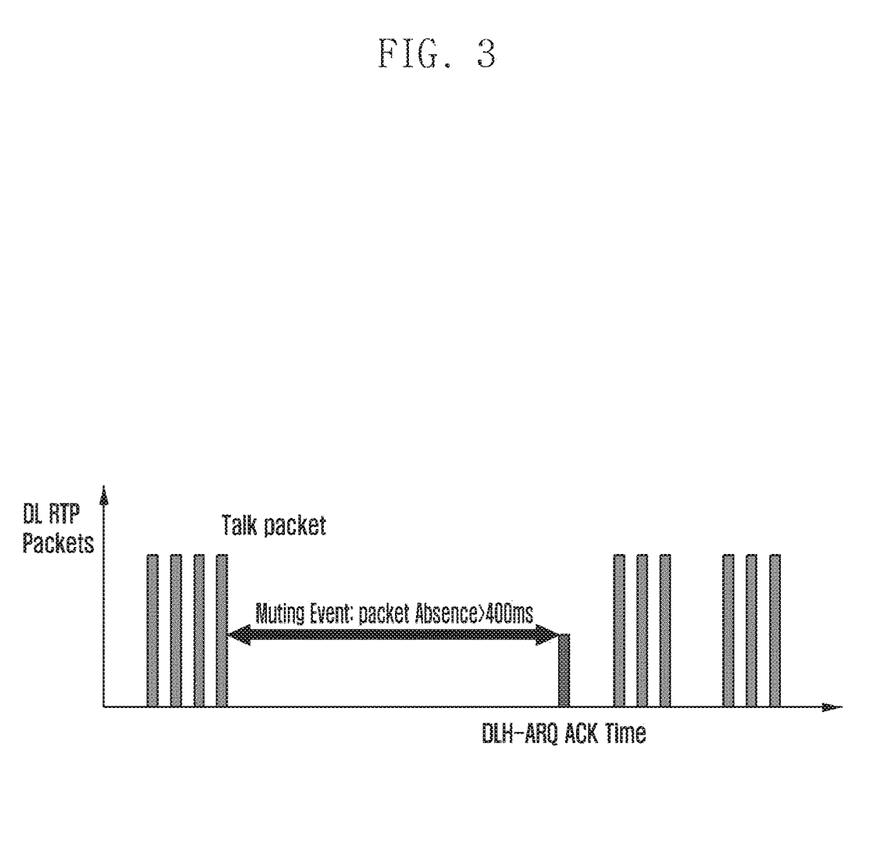
FIG. 3 is a graph for explaining a muting according to an embodiment of the present disclosure.

FIG. 3 is a graph for explaining a muting according to an embodiment of the present disclosure.

Referring to FIG. 3, if an interval between two consecutive voice packets is longer than the first threshold (e.g., 400 ms) during user's speech in a mobile communication network, the server may determine that muting has occurred.

Also, if the number of lost packets during the interval between two consecutive packets is greater than the second threshold (e.g., 20), the server may determine that muting has occurred.

Also, the server may determine that muting has occurred if the interval between two consecutive voice packets is longer than the first threshold (e.g., 400 ms) and if the number of lost packets during the interval between two consecutive packets is greater than the second threshold (e.g., 20).

In an embodiment of the present disclosure, the server may detect a voice packet (data) occurrence period during which a user make a speech. In an embodiment of the present disclosure, if a first setting value (interval between two consecutive voice packets/number of lost packets) is less than a second setting value (20 msc*(1−a)+160 msec*a, here, 0≤a≤1), the server may determine that the corresponding period as a voice packet (data) occurrence period. Here, "a" may denote a ratio of silence insertion descriptor (SID) packets to Talk packets.

In the method of determining the talk period and SID period based on the packet size at the time point when the muting starts according to the related art, it is likely that there may be many exceptional cases in distinguishing between the Talk and SID periods based on only the packet information. In order to solve this problem, the present disclosure proposes a method of calculating an average inter-arrival time of the packets lost during a candidate muting period and, if the Talk packet transmission time duration is greater than the SID packet transmission time duration, determining the candidate muting period as a voice packet (data) occurrence period.

In an embodiment of the present disclosure, the server may use a muting ratio, a packet loss ratio, or a jitter ratio calculated in the voice call session as a per-call quality metric, an inter-cell quality metric, and an inter-eNB quality metric. Particularly, the per-link muting ratio proposed in the present disclosure is calculated as follows:

<per-link muting ratio calculation in voice call session>
measurable muting ratios
Muting ratio calculated at a time point when a first eNB forwards a packet from a first UE through a backhaul (A)
Muting ratio calculated at a time point when the packet arrives at a second eNB through the backhaul (B)
Muting ratio calculated at a time point when the second eNB receives ACK/NACK information transmitted by a second UE (C)
per-network link muting ratio calculation with three muting ratio values
muting ratio on a link from the first UE to the first eNB:A
muting ratio on a link from a first eNB to a second eNB:B−A
muting ratio from the second eNB to the second UE:C−B The first eNB provides the voice communication service to the first UE, and the second eNB provides the voice communication service to the second UE. For example, the first eNB may denotes a source eNB, and the second eNB may be a target eNB.

In an embodiment of the present disclosure, the server may calculate a user-experienced muting ratio as a voice call service quality index as follows.

User-Experienced Muting Ratio Calculation Method

The server calculates a VoLTE quality based on the ACK/NACK information transmitted by a UE to measure a user-experienced quality. If an eNB transmits a Real-time Transport Protocol (RTP) packet to a UE, the UE transmits ACK/NACK information to the eNB in response to the RTP packet.

The eNB records the ACK/NACK information corresponding to the packet and time when the ACK/NACK information has been received and calculates the user-experienced voice quality by analyzing the recorded information. Here, a muting period ratio, packet loss ratio, and/or a jitter information may be used as user-experienced quality metrics.

The server may also match transmit and receive UEs as follows before calculating the user-experienced muting ratio as a quality metric per voice call.

Tx-Rx UE Matching-Based End-to-End VoLTE Quality Analysis Method

In an embodiment of the present disclosure, the server may analyze an end-to-end VoLTE quality by matching a transmit UE and a receive UE. The server may match a transmit UE and a receive UE based on call start/end time information and synchronization source (SSRC) and user datagram protocol (UDP) port information included in the UDP and real-time transport protocol (RTP) headers.

First, the server searches for a call having a mutual relationship between its start and end points. Here, the mutual relationship may denote that the call starts and ends in a predetermined error range.

For example, if SSRC_UL(1) and UDP port_UL(1) of a uplink (UL) packet of a transmit UE(1) and SSRC_DL(1) and UDP port_DL(1) of the downlink (DL) packet of the transmit UE(1) match SSRC_DL(2) and UDP port_DL(2) of a DL packet of a receive UE(2) and the SSRC_UL(2) and UDP port_DL(2) of a UL packet of the receive UE(2), respectively, as shown in Equation 1, the server assumes that the transmit UE(1) and the receive UE(2) communicate to each other.

$$SSRC\_UL(1)==SSRC\_DL(2)$$

$$SSRC\_DL(1)==SSRC\_UL(2)$$

$$UDP\_Port\_UL(1)==UDP\_Port\_DL(2)$$

$$UDP\_Port\_DL(1)==UDP\_Port\_UL(2) \quad \text{Equation 1}$$

That is, the server may check for the call start and end information to determine whether a first identifier of the uplink packet of the first UE is identical with the second identifier of the downlink packet of the second UE and whether the third identifier of the downlink packet of the first UE is identical with the fourth identifier of the uplink packet of the second UE. If the calls of the first and second UEs match in call start and end time points, if the first and second identifiers match, and if the third and fourth identifiers match, the server may assume that the first and second UEs are communicating to each other.

If the calls of the transmit UE(1) and the receive UE(2) match, the server may calculate VoLTE quality key performance indicator (KPI) (muting, loss, and jitter) on a UL air link, an inter-layer link inside the eNB, a backhaul link, and a DL air link. According to an embodiment of the present disclosure, the server may calculate a one-way delay by averaging the one-way delays measured in opposite directions.

According to an embodiment of the present disclosure, the server may calculate per-link muting ratios of the voice call as inter-cell or inter-eNB quality metric to locate a problematic part of the network.

According to an embodiment of the present disclosure, the server may calculate per-link muting ratios and user-experienced muting ratio of the voice call and perform transmit-receive UE matching to generate per-call quality metric values for use in locating a problematic part of the network.

Figure 4:
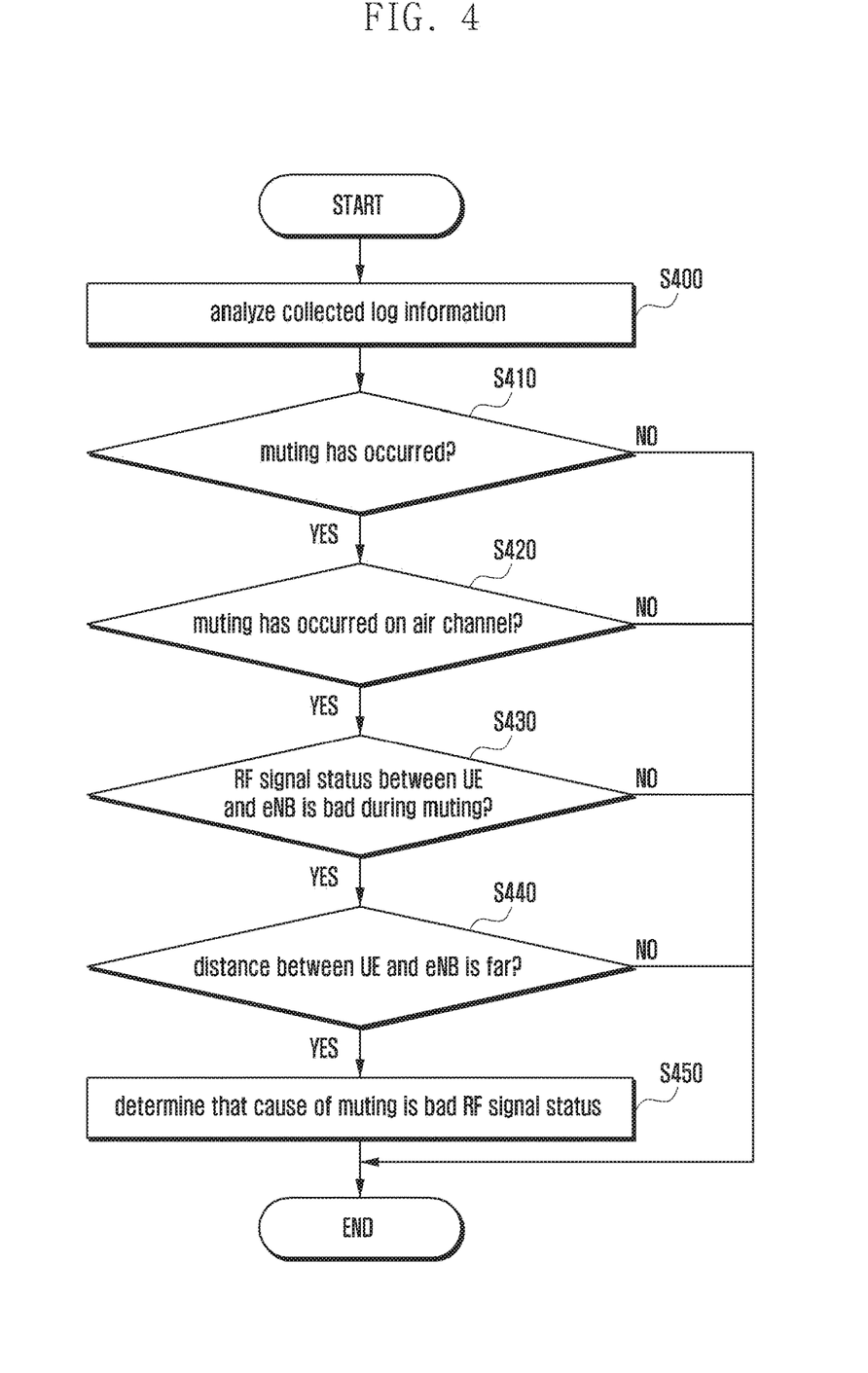
FIG. 4 is a flowchart illustrating a procedure for a server to detect a muting between an evolved node B (eNB) and a user equipment (UE) according to an embodiment of the present disclosure.

FIG. 4 is a flowchart illustrating a procedure for a server to detect a muting between an eNB and a UE according to an embodiment of the present disclosure.

Referring to FIG. 4, the server may analyze log information received from at least one eNB at operation S400 and determine at operation S410 whether muting has occurred during a voice call.

If it is determined that muting has occurred, the server may determine at operation S420 whether the muting has occurred on an air link based on the log information. If it is determined that the muting has occurred on an air link, the server may determine at operation S430 whether the radio frequency (RF) signal status between the eNB and the UE is bad and, if so, determine at operation S440 whether the distance between the eNB and the UE which is acquired from the eNB-UE distance information included in the log information is greater than a predetermined threshold.

If it is determined that the RF signal status is worse than a predetermined status and the eNB-UE distance is greater than the predetermined threshold (in consideration of the distance information), the server may determine that the muting has occurred between the eNB and the UE. That is, the server may determine at operation S450 that the cause of the muting is the bad RF signal status.

If the muting lasts for a long period in DL, the server may check for the RF signal problem. The server may analyze the RF information, timing advance (TA) information, and geometric information during the DL muting period to determine whether the muting is caused by poor RF signal status or an interference. The server may provide the determination result in order for the operator to make a management decision regarding whether to deploy a new network or adjust antenna arrangement for service quality improvement.

Figure 5:
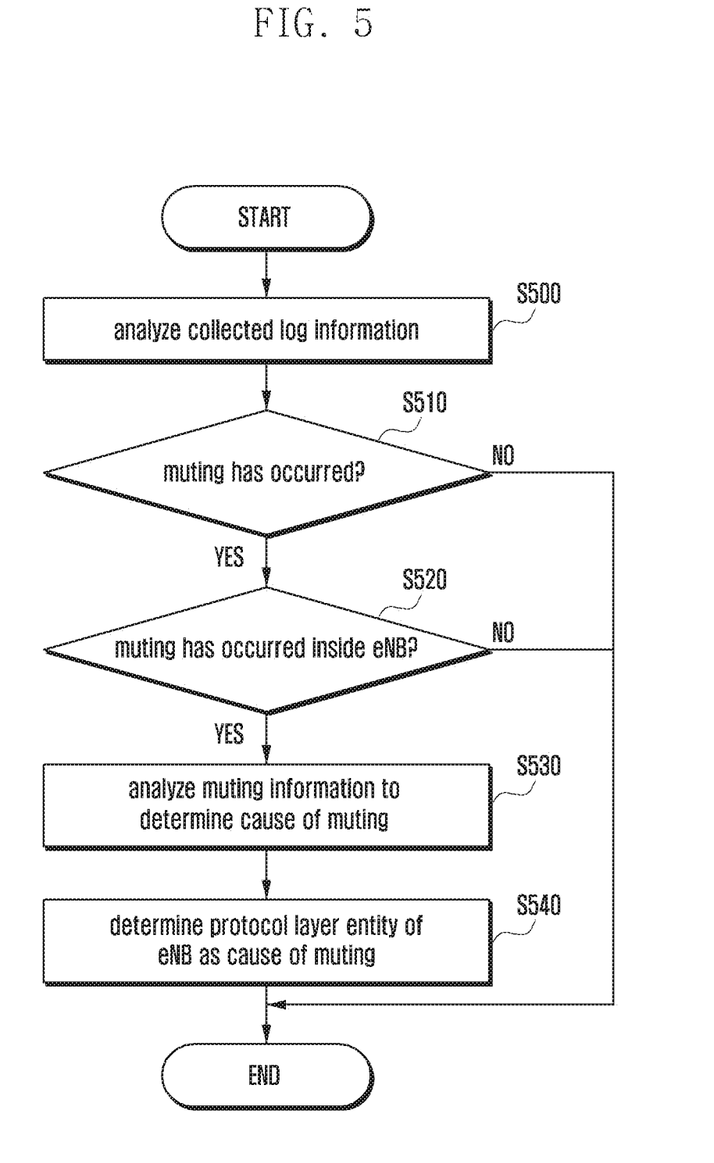
FIG. 5 is a flowchart illustrating a procedure for a server to detect the cause of muting inside an eNB according to an embodiment of the present disclosure.

FIG. 5 is a flowchart illustrating a procedure for a server to detect the cause of muting inside an eNB according to an embodiment of the present disclosure.

Referring to FIG. 5, the server may analyze log information received from at least one eNB in a mobile communication network at operation S500 and determine at operation S510 whether muting has occurred during the voice call based on the analysis result.

If it is determined that muting has occurred, the server may determine at operation S520 whether the muting has occurred inside the eNB and, if so, analyze the muting information to determine the cause of the muting at operation S530.

The server may determine a certain protocol layer entity of the eNB as the cause of the muting based on the analysis result at operation S540.

Figure 6:
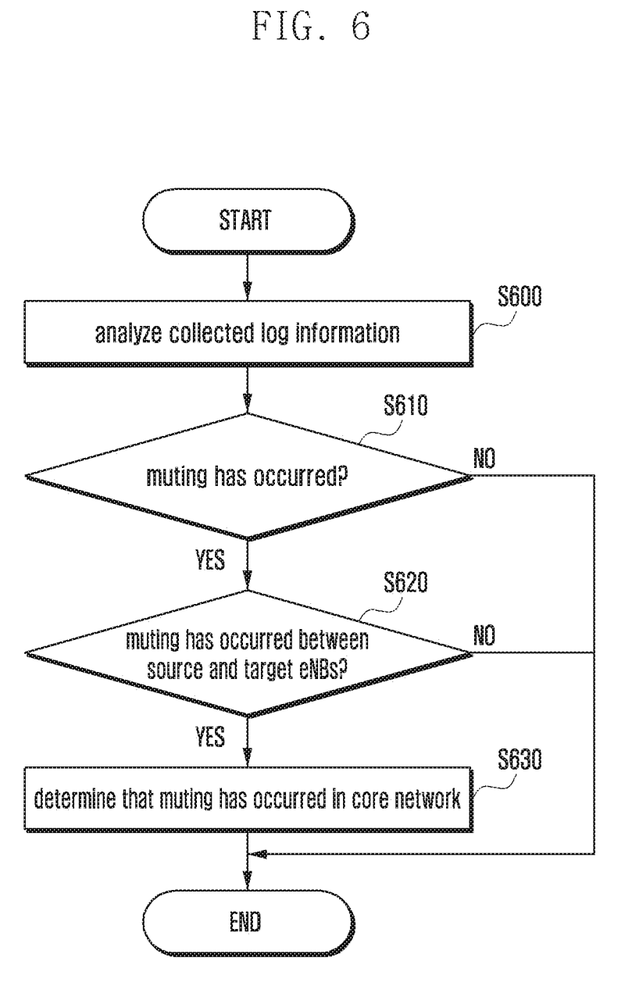
FIG. 6 is a flowchart illustrating a procedure for a server to detect the cause of muting within a core network according to an embodiment of the present disclosure.

FIG. 6 is a flowchart illustrating a procedure for a server to detect the cause of muting within a core network according to an embodiment of the present disclosure.

Referring to FIG. 6, the server may analyze log information received from at least one eNB in a mobile communication network at operation S600 and determine at operation S610 whether muting has occurred during the voice call based on the analysis result.

If it is determined that muting has occurred, the server may determine at operation S620 whether the muting has occurred on a link between a first eNB (or source eNB) and a second eNB (or target eNB) based on the log information. If it is determined that the muting has occurred on a link between the first and second eNBs, the server may assume an operation S630 that the muting has occurred in the core network.

If the muting lasts for a long time on a backhaul link, the server may assume that the muting has occurred in the core network. If the muting ratio on the backhaul link is greater than that on an air link or inside the eNB, the server may determine that the muting has occurred in the core network. In this case, the server may provide the determination result in order for the operator to check the backhaul between the corresponding eNBs.

Figure 7:
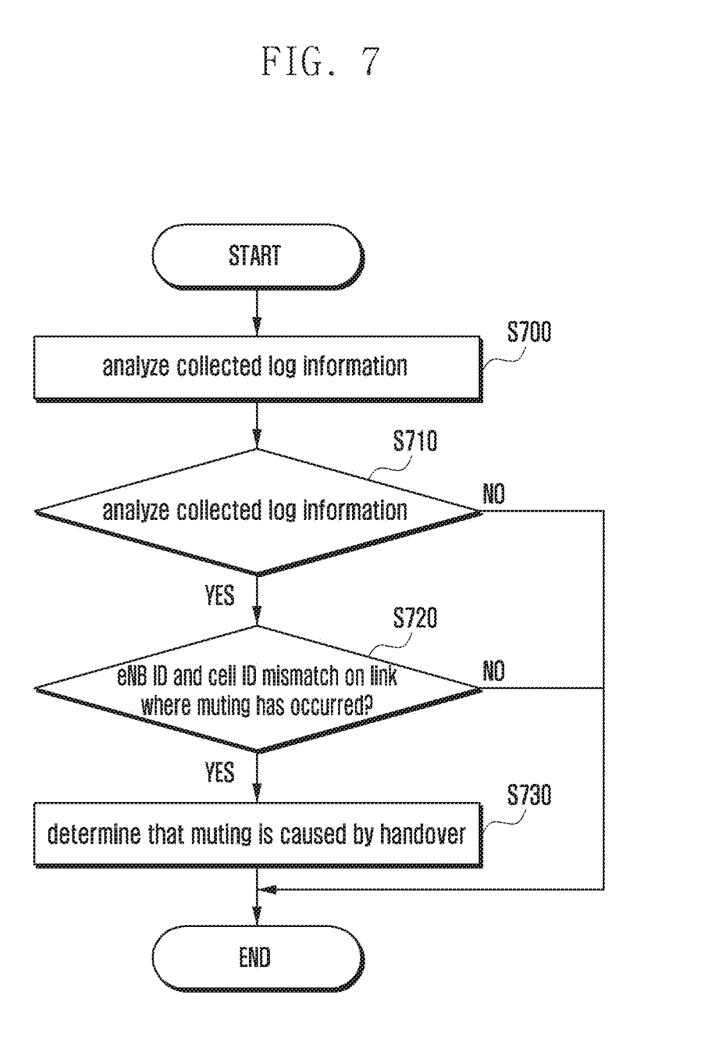
FIG. 7 is a flowchart illustrating a procedure for a server to detect the cause of muting during the handover of a UE according to an embodiment of the present disclosure.

FIG. 7 is a flowchart illustrating a procedure for a server to detect the cause of muting during the handover of a UE according to an embodiment of the present disclosure.

Referring to FIG. 7, the server may analyze log information received from at least one eNB in a mobile communication network at operation S700 and determine at operation S710 whether muting has occurred during the voice call based on the analysis result.

If it is determined that muting has occurred, the server may determine whether the UE is handed over between a first eNB (or source eNB) and a second eNB (or target eNB) based on the log information. The server may compare an eNB ID and a cell ID used on the link where the muting has occurred to determine whether the two IDs mismatch at operation S720 and, if the two IDs mismatch, determine at operation S730 that the muting is caused by the handover.

FIG. 8 is a conceptual diagram illustrating a voice call quality management method in a mobile communication network according to an embodiment of the present disclosure.

Referring to FIG. 8, the LTE radio protocol stack of an eNB includes a packet data convergence protocol (PDCP) layer, a radio link control (RLC) layer, a medium access control (MAC) layer, and a physical (PHY) layer.

The PDCP layer is responsible for IP header compression/decompression and the RLC layer is responsible for segmenting a PDCP packet data unit (PDU) into segments of appropriate size for automatic repeat request (ARQ) operation. The MAC layer is responsible for multiplexing RLC PDUs into MAC PDUs and demultiplexing MAC PDUs into RLC PDUs. The PHY layer is responsible for channel coding and modulation on higher layer data to generate orthogonal frequency division multiplexing (OFDM) symbols being transmitted through a radio channel and for demodulation and channel decoding on the OFDM symbols received through a radio channel and delivering the decoded data to higher layers.

Referring to FIG. 8, the eNB may collect log information when transmitting packets through a backhaul at operation S800, when receiving packets through the backhaul at operation S810, when transmitting packets to a UE at operation S820, and when receiving HARQ ACK/NACK information from the UE at operation S830.

The log information may include UE-specific RF information (reference signal received power (RSRP), signal-to-noise ratio (SNR), QoS class identifier (QCI), etc.), UE-specific TA information (for use in calculating distance between UE and eNB), and international mobile subscriber identity (IMSI)/international mobile equipment identity (IMEI).

The eNB may transmit the log information collected at S800 to S830 to the server, and the server may calculate a quality metric value during the voice call in a mobile communication network based on the log information and manage voice call quality information.

Figure 9:
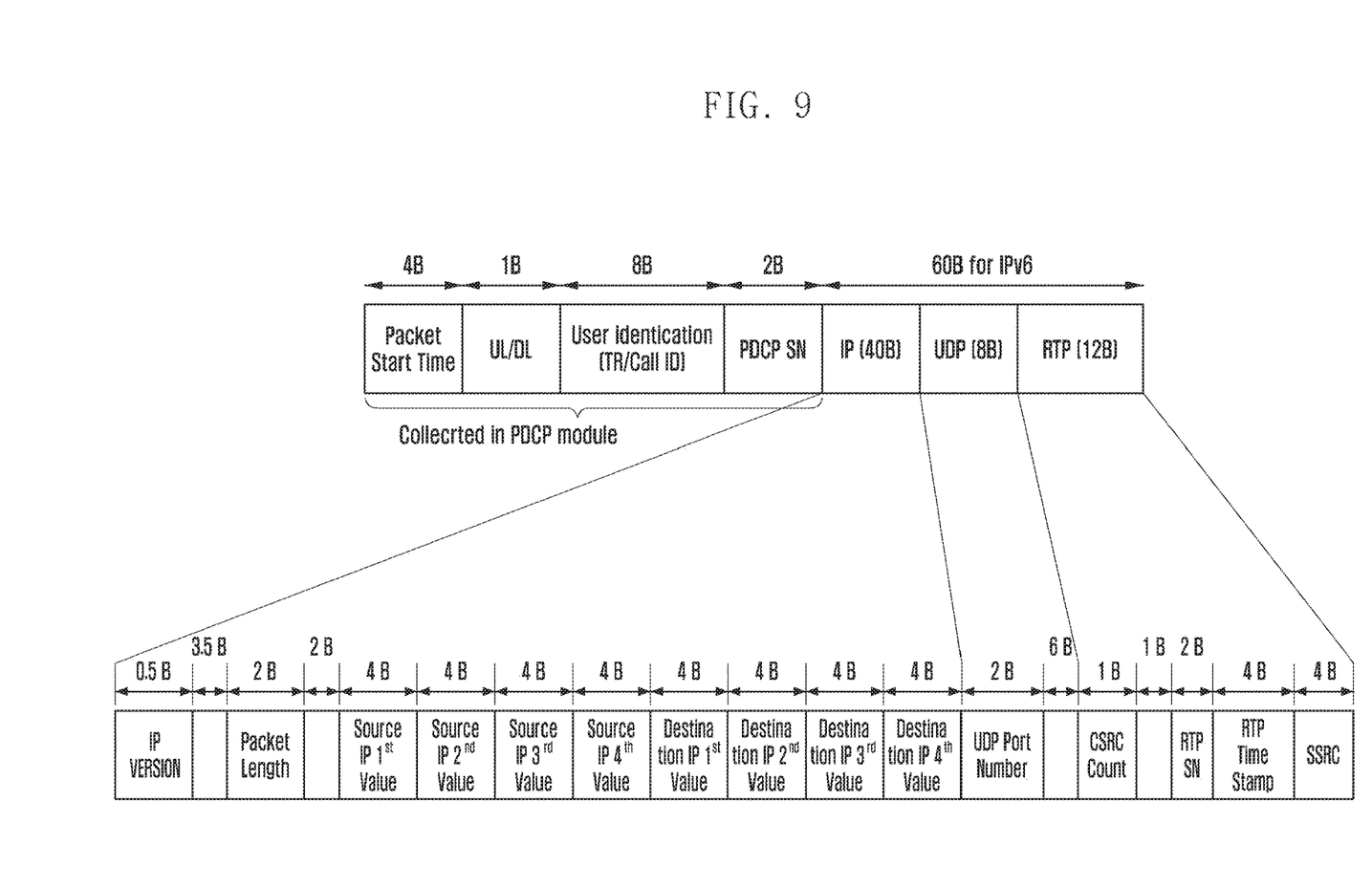
FIG. 9 is a diagram illustrating rearrangement of packet information according to an embodiment of the present disclosure.

FIG. 9 is a diagram illustrating rearrangement of packet information according to an embodiment of the present disclosure.

Referring to FIGS. 8 and 9, the eNB may collect log information at S800 and S810 for use in determining whether muting has occurred in the core network. The log information collected by the eNB may be rearranged as packet information depicted in FIG. 9.

The packet information may include packet start time, UL/DL indication, user identification (ID), PDCP sequence number (SN), IP information, UDP information, and RTP information.

According to various embodiments of the present disclosure, the eNB may rearrange the packet information and transmits the rearranged packet information to the server, or the eNB may rearrange the packet information received from the eNB.

Figure 10:
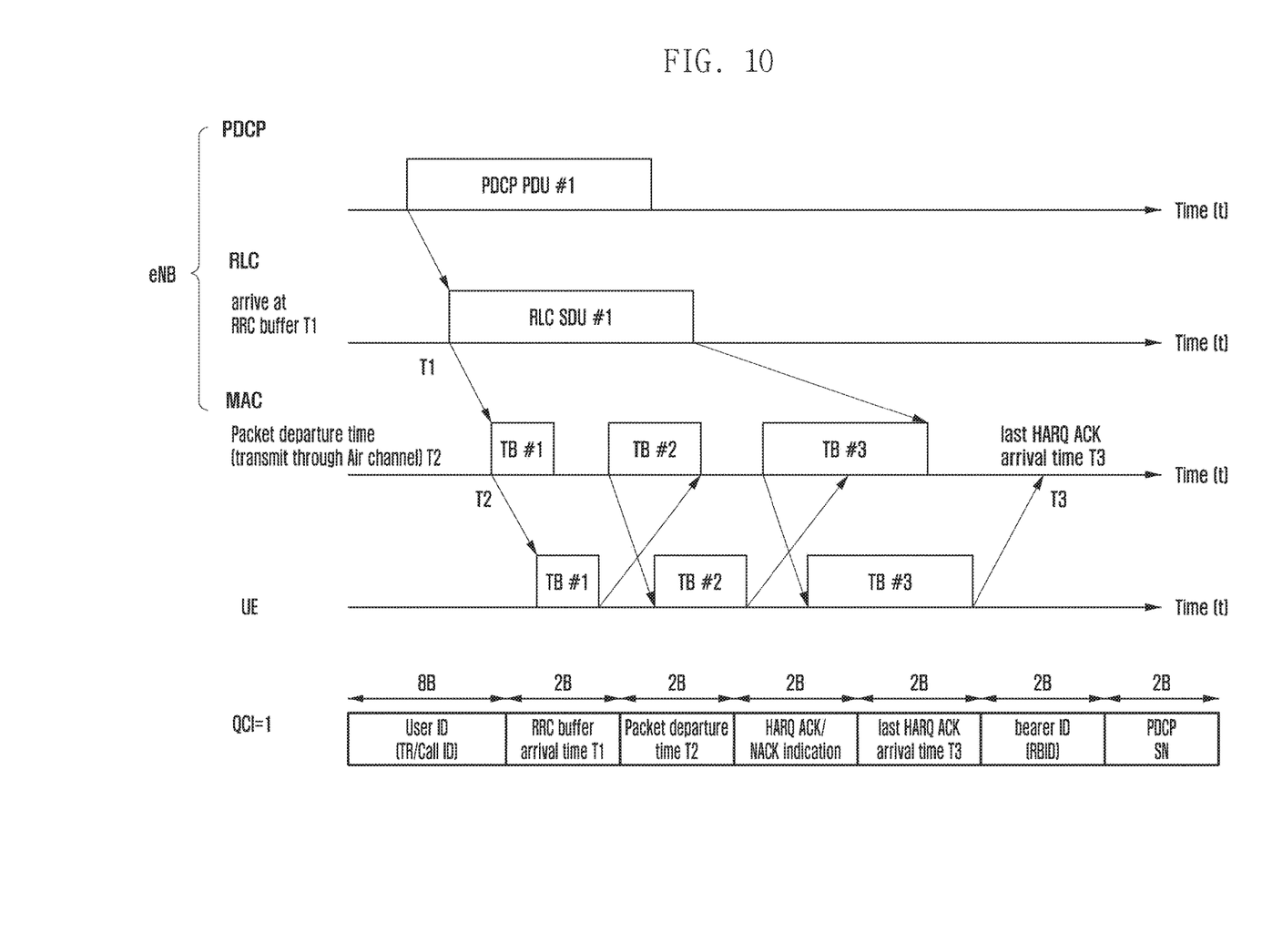
FIG. 10 is a diagram illustrating rearrangement of packet information according to another embodiment of the present disclosure.

FIG. 10 is a diagram illustrating rearrangement of packet information according to another embodiment of the present disclosure.

Referring to FIGS. 8 and 10, the eNB may collect the log information at S820 and S830 for use in determining whether muting has occurred on a link between the eNB and a UE. The log information collected by the eNB may be rearranged as packet information depicted in FIG. 10.

The packet information may include user identifier (ID), RLC buffer arrival time (T1), packet departure time (T2), HARQ ACK/NACK indication, last HARQ ACK arrival time (T3), radio bearer identifier (RB ID), and PDCP SN.

Here, 'T2−T1' may denote a buffering and processing time, and 'T3−T2' may denote VoLTE packet air latency and HARQ ACK/NACK reception time.

According to various embodiments of the present disclosure, the eNB may rearrange the packet information and transmits the rearranged packet information to the server, or the eNB may rearrange the packet information received from the eNB.

Figure 11:
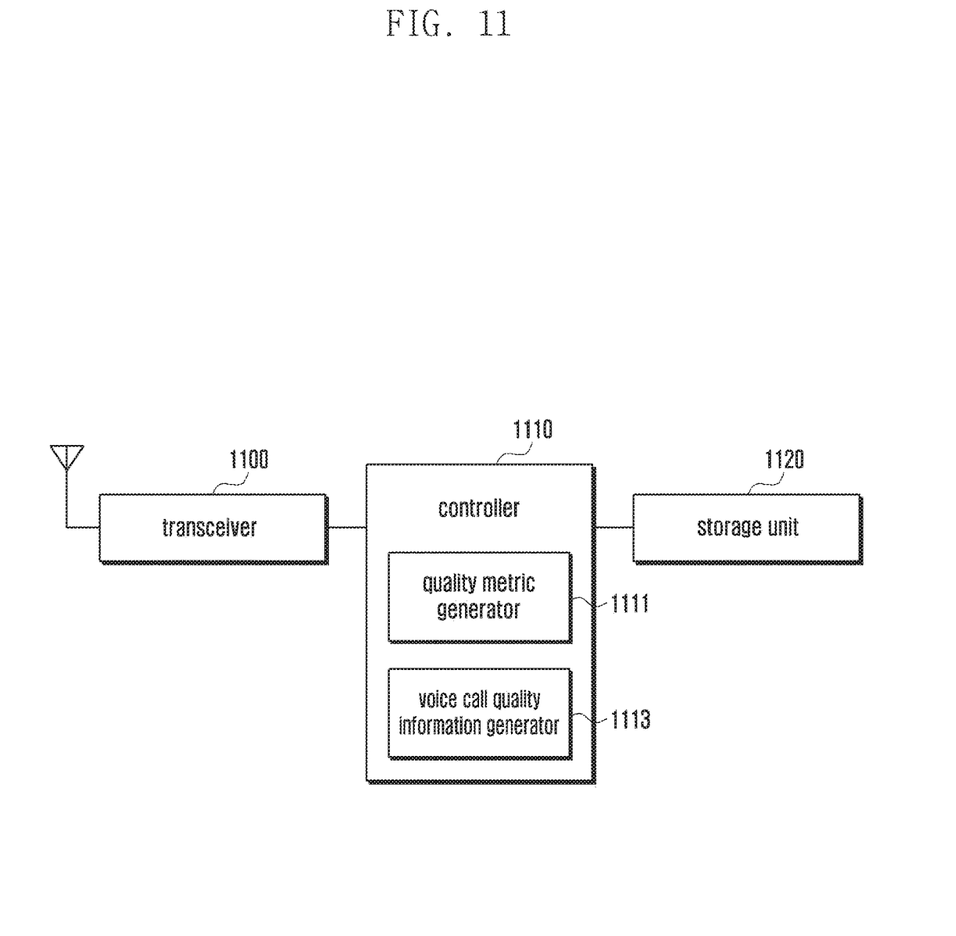
FIG. 11 is a block diagram illustrating a configuration of a server according to an embodiment of the present disclosure.

FIG. 11 is a block diagram illustrating a configuration of a server according to an embodiment of the present disclosure.

Referring to FIG. 11, the server may include a transceiver 1100, a controller (e.g., at least one processor) 1110, and a storage unit 1120.

The transceiver 1100 may take charge of data communication function of the server for radio communication. The transceiver 1100 may include an RF transmitter for up-converting and amplifying a transmission signal and an RF receiver for low-noise-amplifying and down-converting a received signal.

The transceiver 1100 may also output data carried in the signal received through the radio channel to the controller 1110 and transmit the data generated by the controller 1110 through the radio channel.

The controller 1110 controls signal flows among the function blocks for the operations as described in the various embodiments of the present disclosure. The controller 1110 may control the transceiver 1100 to receive log information from at least one eNB, determine whether muting has occurred based on the log information, calculate per-link muting ratios in the mobile communication network based on the analysis result, and generate per-link voice call quality informations in the mobile communication based on the per-link muting ratios.

The controller 1110 may include a quality metric calculator 1111 and a voice call quality information generator 1113 for performing the above function.

The quality metric calculator 1111 may calculate the per-link muting ratio by the call, the cell, or the eNB.

According to an embodiment of the present disclosure, if the per-link muting ratio is calculated by the call, the per-link muting ratio may denote the ratio of total muting time to the corresponding voice call session.

According to an embodiment of the present disclosure, if the per-link muting ratio is calculated by the cell, the per-link muting ratio may denote the ratio of total muting time to the period of all voice call sessions established in the cell.

According to an embodiment of the present disclosure, if the per-link muting ratio is calculated by the eNB, the per-link muting ratio may denote the ratio of total muting time to the period of all voice call sessions established with the eNB.

The voice call quality information generator 1113 may generate per-link voice call quality information in the mobile communication network based on the per-link muting ratios and locate a part causing voice call quality problem in the network.

The storage unit 1120 may store programs and data required for the operations of the server and may be divided into a program region and a data region.

As described above, the voice call quality information generation method of the present disclosure is advantageous in terms of managing voice call service quality efficiently based on per-link muting ratios of a mobile network which are calculated using the log information collected by a base station.

Also, the voice call quality information generation method of the present disclosure is advantageous in that a server checks for a cause of poor quality of the voice call service and provides the information on the cause of the poor voice call service quality.

While the present disclosure has been shown and described with reference to various embodiments thereof, it will be understood by to those skilled in the art that various changes in form and details may be made therein without departing from the spirit and scope of the present disclosure as defined by the appended claims and their equivalents.

What is claimed is:

1. A voice call quality information generation method of a server in a wireless communication system, the voice call quality information generation method comprising:
   receiving log information from at least one base station;
   determining muting has occurred when an interval between two consecutive voice packets during a voice call is greater than a first threshold based on the log information; and
   when the muting has occurred, generating voice call quality information using muting information generated based on the log information.

2. The method of claim 1, wherein the generating of the voice call quality information comprises:
   calculating, when muting has occurred, per-link muting ratios in a mobile network; and
   generating the voice call quality information per link based on the per-link muting ratios.

3. The method of claim 1, wherein the per-link muting ratio is calculated by one of the call, the cell, or the base station.

4. The method of claim 3, wherein the per-link muting ratio comprises:
   a ratio of total muting time to a voice call session for a case where the per-link muting ratio is calculated by the call,
   a ratio of total muting time to a period of all voice call sessions established in a cell for a case where the per-link muting ratio is calculated by the cell, and
   a ratio of total muting time to a period of all voice call sessions established with a base station for a case where the per-link muting ratio is calculated by the base station.

5. The method of claim 1, further comprising determining that muting has occurred when a number of lost packets between the two consecutive voice packets is greater than a second threshold.

6. The method of claim 1, further comprising:
   checking for, when muting is detected based on the log information, radio frequency (RF) signal status between the base station and a terminal; and
   determining whether muting has occurred between the base station and the terminal based on the RF signal status and information on distance between the base station and the terminal.

7. The method of claim 1, further comprising:
   determining whether muting has occurred inside the base station based on the log information; and
   deciding that the muting has occurred inside the base station based on the determination result.

8. The method of claim 1, further comprising:
   determining whether muting has occurred in a core network between two base stations based on the log information; and
   deciding that muting has occurred in the core network based on the determination result.

9. The method of claim 1, further comprising:
  determining whether a terminal is handed over between two base stations based on the log information; and
  determining that muting has occurred by the handover based on the determination result.

10. The method of claim 1, further comprising grouping packets belonging to the same call based on the log information.

11. The method of claim 10, wherein the grouping of the packets comprises:
  checking for a call start point and a call end point;
  determining whether a first identifier in an uplink packet of a first terminal is identical with a second identifier in a downlink packet of a second terminal and a third identifier in a downlink packet of the first terminal is identical with a fourth identifier in an uplink packet of the second terminal; and
  determining, when the first and second terminals have same call start and end points, that the first and second identifiers are identical with each other, that the third and fourth identifiers are identical with each other, and that the first and second terminal are communicating to each other.

12. The method of claim 1, wherein the log information comprises at least one of information on a first packet traveling between a terminal and a base station, information on a second packet traveling inside the base station, or information on a third packet traveling between the base station and another base station.

13. The method of claim 12, further comprising rearranging at least one of the information on the first packet, the information on the second packet, or the information on the third packet to analyze the log information.

14. A server for generating voice call quality information in a wireless communication system, the server comprising:
  a transceiver which transmits and receives signals; and
  at least one processor configured to:
    control the transceiver to receive log information from at least one base station,
    determine muting has occurred when an interval between two consecutive voice packets during a voice call is greater than a first threshold based on the log information, and
    when the muting has occurred, generate the voice call quality information based on muting information generated based on the log information.

15. The server of claim 14, wherein the at least one processor is further configured to:
  calculate, when muting has occurred, per-link muting ratios in a mobile network, and
  generate the voice call quality information per link based on the per-link muting ratios.

16. The server of claim 14, wherein the per-link muting ratio is calculated by one of the call, the cell, or the base station.

17. The server of claim 14, wherein the at least one processor is further configured to:
  check for, when muting is detected based on the log information, radio frequency (RF) signal status between the base station and a terminal, and
  determine whether muting has occurred between the base station and the terminal based on the RF signal status and information on distance between the base station and the terminal.

18. The server of claim 14, wherein the at least one processor is further configured to:
  determine whether muting has occurred inside the base station based on the log information, and
  determine that the muting has occurred inside the base station based on the determination result.

19. The server of claim 14, wherein the at least one processor is further configured to:
  determine whether muting has occurred in a core network between two base stations based on the log information, and
  determine that the muting has occurred in the core network based on the determination result.

20. The server of claim 14, wherein the at least one processor is further configured to:
  determine whether a terminal is handed over between two base stations based on the log information, and
  determine that muting has occurred by the handover based on the determination result.

* * * * *